(12) United States Patent
Anderson

(10) Patent No.: US 12,240,357 B2
(45) Date of Patent: Mar. 4, 2025

(54) CUSHIONED PAD APPARATUS TO INDICATE AND ALERT PRESENCE OF AN UNATTENDED OCCUPANT WITHIN A VEHICLE

(71) Applicant: Charita Robin Anderson, Phoenix, AZ (US)

(72) Inventor: Charita Robin Anderson, Phoenix, AZ (US)

(*) Notice: Subject to any disclaimer, the term of this patent is extended or adjusted under 35 U.S.C. 154(b) by 0 days.

(21) Appl. No.: 17/865,459

(22) Filed: Jul. 15, 2022

(65) Prior Publication Data

US 2023/0054366 A1 Feb. 23, 2023

Related U.S. Application Data

(60) Provisional application No. 63/234,420, filed on Aug. 18, 2021.

(51) Int. Cl.
| | |
|---|---|
| G08B 21/00 | (2006.01) |
| B60N 2/00 | (2006.01) |
| B60N 2/26 | (2006.01) |
| B60N 2/64 | (2006.01) |

(52) U.S. Cl.
CPC ............ *B60N 2/64* (2013.01); *B60N 2/0021* (2023.08); *B60N 2/0025* (2023.08); *B60N 2/0033* (2023.08); *B60N 2/267* (2023.08); *B60N 2210/40* (2023.08); *B60N 2230/20* (2023.08)

(58) Field of Classification Search
CPC ........ B60N 2/002; B60N 2/64; B60N 2/7005; G08B 21/22; G08B 21/24; B60R 21/01546

USPC ................................................. 340/667, 457
See application file for complete search history.

(56) References Cited

U.S. PATENT DOCUMENTS

| | | | |
|---|---|---|---|
| 6,998,988 B1 | 2/2006 | Kalce | |
| 8,063,788 B1 | 11/2011 | Morningstar | |
| 9,393,897 B2* | 7/2016 | Gomez-Collazo | ... B60N 2/2866 |
| 2007/0052529 A1* | 3/2007 | Perez | ..... B60N 2/002 340/457 |
| 2011/0084807 A1* | 4/2011 | Logan | ..... H04W 4/029 340/10.1 |
| 2015/0274036 A1* | 10/2015 | Arad | ..... G08B 21/22 340/573.1 |
| 2016/0379459 A1* | 12/2016 | Trang | ..... G08B 25/08 340/457 |
| 2017/0323549 A1* | 11/2017 | Copulos | ..... G08B 21/24 |
| 2018/0056814 A1* | 3/2018 | Tanyi | ..... B60N 2/002 |
| 2018/0322758 A1* | 11/2018 | Rubinstein | ..... G08B 21/22 |

* cited by examiner

*Primary Examiner* — Mark S Rushing
(74) *Attorney, Agent, or Firm* — Gutwein Law; Tyler B. Droste

(57) ABSTRACT

A cushioned device configured to prevent an occupant of a vehicle from being left unattended. The device includes a cushioned pad with a pressure sensor, a dongle, and an optimal application for receiving a pressure signal detected by the cushioned device. The application and dongle capable of generating an audible noise and associated notifications when a predetermined distance between the cushioned portion and the dongle and/or application is too great indicating that the object on the cushioned pad is now unattended. Accordingly, this system utilizes the proximity of companion devices and detected pressure signal to determine unattended occupancy in a confined space.

18 Claims, 4 Drawing Sheets

CUSHIONED PAD APPARATUS TO INDICATE AND ALERT PRESENCE OF AN UNATTENDED OCCUPANT WITHIN A VEHICLE

CROSS REFERENCE TO RELATED APPLICATIONS

This U.S. patent application claims priority to U.S. Provisional Patent Application No. 63/234,420 filed 18 Aug. 2021 to the above-named inventor of which the disclosure is considered part of the disclosure of this application and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention of the present disclosure most generally relates to a stand-alone seating apparatus configured to indicate the presence of an unattended occupant in a vehicle or other enclosed area or structure. More particularly the invention of the present disclosure relates to a cushioned device with a companion application and dongle configured to sense occupancy and proximity and to generally alert a user that an occupant may be remaining in a vehicle unattended.

BACKGROUND

It is well known that in temperature extremes the interior of a vehicle, when not ventilated or temperature controlled, can become very cold or very hot. These interior vehicle temperature extremes can create a very inhospitable environment that makes the survival of humans and animals difficult. Despite these extremes, unfortunately, each year several children and pets are tragically left unattended in vehicles.

As this is a well-known and established problem, there have been several attempts to develop and implement systems to prevent this tragic occurrence. One such system is U.S. Pat. No. 8,063,788 to Morningstar and entitled "Unattended Child Alert System and Method". This '788 patent discloses a warning system for notifying another person when a child is left unattended in a child safety seat. This '788 device is tied to a driver seatbelt, wherein if a child remains in a car seat when the driver seatbelt is disengaged an alarm will alert the driver to the situation. Although helpful, this '788 device requires coupling to the mechanical features of a seatbelt and would not be considered a portable or universal solution.

Other known references to combat this problem, are also generally tied to a seat belt or a door. Still other solutions, such as U.S. Pat. No. 6,998,988 to Kalce entitled "Infant Alarm System for an Automobile" utilizes a pressure sensor in combination with a safety buckle of an infant seat, wherein the driver seat utilizes a pressure sensor coupled to the infant seat buckle to indicate and alert a condition when there is no pressure on the seat and the safety buckle clasped. Although helpful, this '988 device also requires coupling to the mechanical features of a child safety belt and would not be considered a portable or universal solution.

SUMMARY OF THE INVENTION

The device of the present disclosure is most generally referred to as a child safety device in the form of a cushioned pad apparatus to indicate and alert unattended occupancy of a vehicle through a proximity system. The system and device provides a robust and portable solution for generating a reminder to a driver of a vehicle as to the presence of an object on a padded surface within the vehicle.

The device can generally encompass several structures and systems to accomplish the notification and alarm features, wherein the device at a minimum includes a cushion portion, a dongle portion, and an application portion in a communicative coupling with each other and wherein each of these portions are able utilize positional or proximity sensors to determine their respective position relative to each other and provide a notification accordingly.

The cushion portion can most generally be described as a planar surface with features enabled to detect a pressure in the form of a weight received on the cushion portion and generally configured to generate a detected pressure signal. The cushion portion having a padded region generally configured to provide cushioning to a user of the device and having an alternate use of protecting the communicative and sensing apparatus of the cushion portion. In the preferred embodiment of the present invention, the padded region is comprised of a memory foam material having a plurality of apertures to allow for airflow and ensure comfort during use.

The cushion portion having an interior space including a plurality of pressure sensors configured in an array to detect a pressure in the form of a weight on a surface of the cushion to generate a detected pressure signal. In the preferred embodiment of the present disclosure, the cushion portion includes an array of six separate pressure sensors generally positioned near a central position of the cushion portion and selected and positioned to detect a weight of an object, such as an infant or pet, placed upon the cushion portion during use of the device and to generate the appropriate pressure signal.

The pressure sensors of the cushion portion are coupled to at least a power source, a controller, a receiver, and transmitter received within the interior space, wherein the controller is configured to direct the function and transmission of the pressure sensors. Accordingly, the controller is configured in a communicative coupling with the dongle and the application portion, wherein the cushion portion detected pressure signal is utilized for operation of all of the alert/alarm features of the cohesive device.

The dongle of the device is generally configured as an easily accessible structure that is provided in companion with the cushion portion. Accordingly, it is most likely that the dongle will be placed onto or carried with a vehicle key the device is used within. The dongle having at least one receiver and a speaker/alarm placed within an interior space and specifically configured to receive the detected pressure signal from the transmitter of the cushion portion and provide a noise for notification purposes. Accordingly, the dongle and cushion communicative coupling between the transmitter and at least one receiver configured to detect and sense a relative distance between each other, wherein the relative proximity between the dongle and the cushion is determined. The relative proximity between the dongle and the cushion enables the activation of an alarm when the dongle is a preselected and predetermined distance from the cushion while a pressure signal is continuously detected by the pressure sensors.

In addition, or alternate, to the dongle, the device application may also be utilized for proximity detection relative to the cushion or the dongle. Accordingly, the application is generally configured for use on a personal electronic device, such as, but not limited to, a cellular phone or smartphone, wherein the various electronic and hardware components of the personal electronic device are utilized by the application communicative coupling to the cushion and dongle or just the cushion or dongle for the detection of the proximal distance between them. This further enables a user of the device the ability to utilize software integrated with the application for customizing a variety of settings, notifications, alerts, and features of the overall system of the device.

The application including the ability to add multiple users to an account associated with a given cushion portion, wherein proximity or other warning or alert notifications can be provided to these multiple users to ensure quick and redundant notification and action in the event of an emergency. Still further, this application may allow for the direct contact of emergency services or emergency contacts within the device or through the hardware of the device the application is provided on.

Additionally, the application may include additional communicative features between the cushion portion and a vehicle the device is used within. These communicative features may enable a communicative coupling between the device and the vehicle, wherein an alarm or alert condition may trigger immediate and effective response to a given condition, such as triggering the remote starting of a vehicle to utilize the climate system of the vehicle to provide a safe environment until a direct response can be provided, such as, but not limited to, operation of the vehicle air conditioning, heater, or windows. Still further, these communicative features of the application may utilize additional vehicle systems such as vehicle internal or external cameras. Alternately, the communicative features between the cushion portion, the dongle, and application can generally be described as portable, wherein the device can alternately operate independently of the vehicle and be considered a portable safety solution.

The alarm feature of the device may generally alert a user when the distance between communicating portions becomes too great while a detected pressure signal is sensed by the cushion portion to generally indicate that an object (child, pet, person, temperature sensitive item) remains on the cushion and may be in a vulnerable state or unattended. The alarm is preferably an audible noise that generates attention and is configured to crescendo in volume to increase this awareness as the proximal distance between the cushion and the dongle increases. Additionally, and alternately, the alarm may additionally trigger a vibration or notification on a personal electronic device the application is used on.

In a preferred embodiment of the device, the communicative coupling of cushion portion, dongle and application is via the Bluetooth wireless communication protocol, wherein this protocol allows for the use of a proven and universal protocol for proximity detection amongst the portions.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
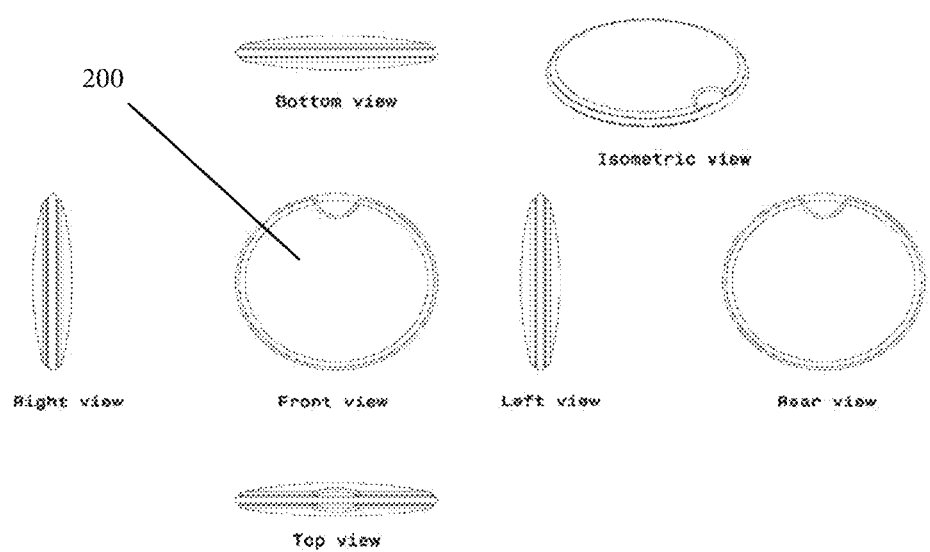
FIG. 1 is an exterior view of a cushion portion of the device, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit, or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Following are more detailed descriptions of various concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The device and system of the present disclosure can most generally be described as a cushioned apparatus configured with a pressure sensor to detect occupancy within a vehicle through a coupling with a dongle and associated application on a personal electronic device.

Figure 2:
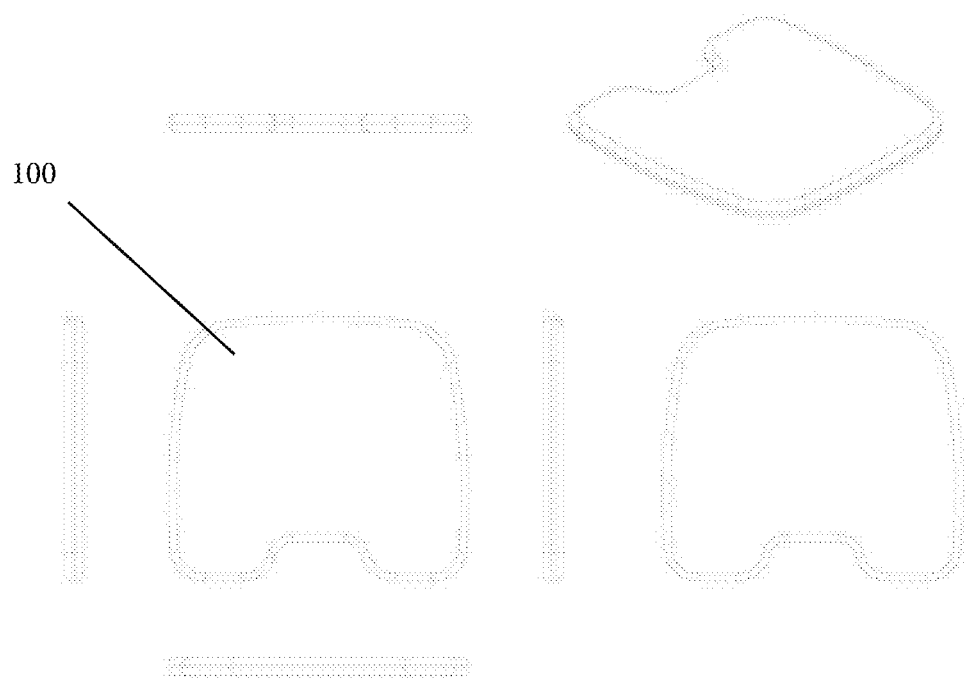
FIG. 2 is a view of the cushion with internal components visible, according to the present disclosure.
Figure 3:
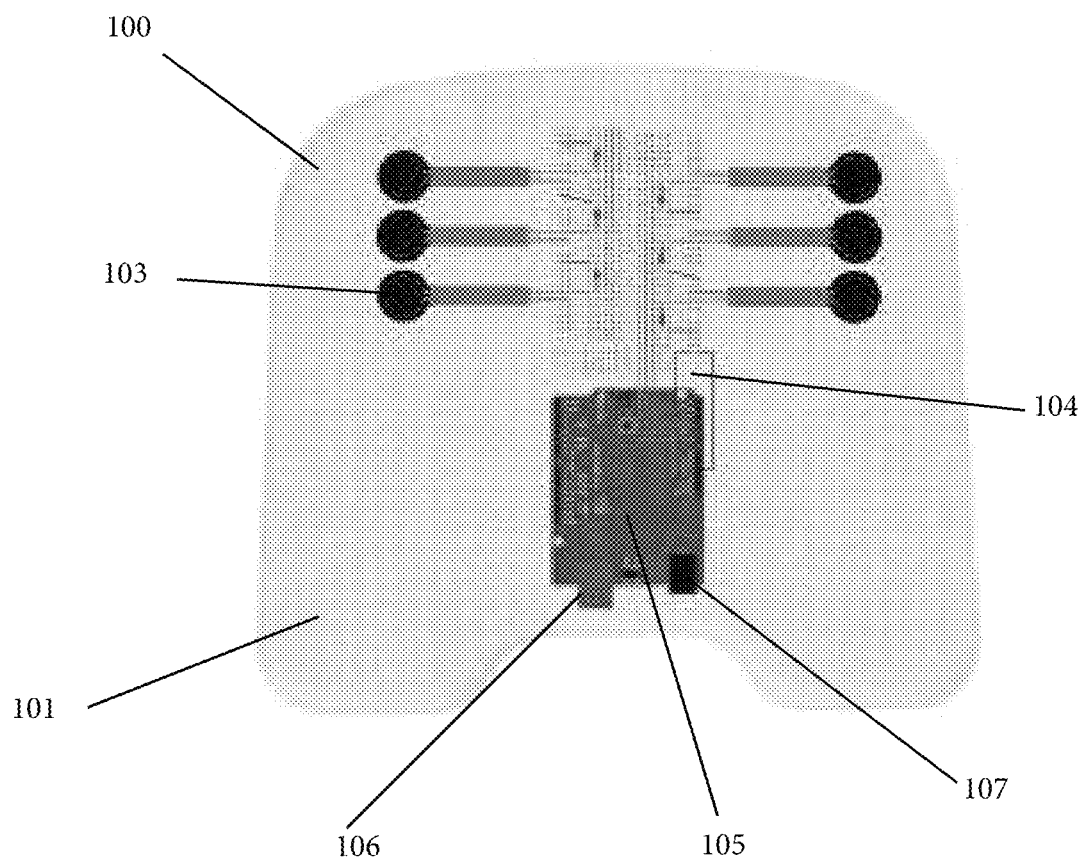
FIG. 3 is view of a dongle portion of the device, according to the present disclosure.
Figure 4:
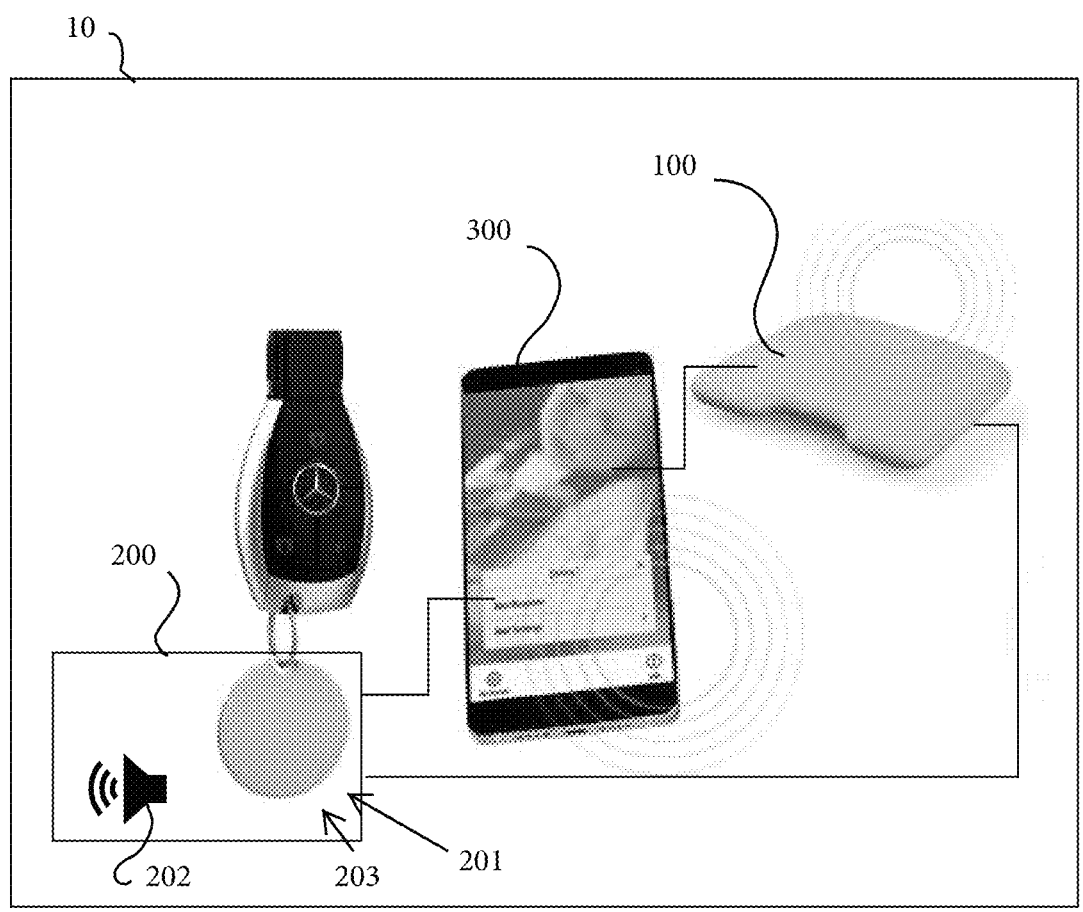
FIG. 4 is a wireframe diagram showing the system of the device, according to the present disclosure.

Referring now to the figures, FIG. 1 to FIG. 4 show various views of the system and structures of the occupancy alerting device of the present disclosure and generally referred to herein as device 10. The device 10 can generally encompass several structures and systems to accomplish the notification and alarm features, wherein the device 10 at a minimum includes a cushion portion 100, a dongle portion 200, and an application portion 300 in a communicative coupling with each other and wherein each of these portions 100, 200, 300 are able to utilize positional or proximity sensors to determine their respective position(s) relative to each other.

The cushion portion 100 can most generally be described as a planar surface with features enabled to detect a pressure in the form of a weight received on the cushion portion 100 and generally configured to generate a detected pressure signal upon receipt of a weight. The cushion portion 100 having a padded region 101 generally configured to provide cushioning to a user of the device 10 and having an alternate use of protecting the communicative and sensing apparatus of the cushion portion 100. In the preferred embodiment of the present invention, the padded region 101 is comprised of a memory foam material having a plurality of apertures to allow for airflow and ensure comfort during use.

The cushion portion 100 having an interior space including a plurality of pressure sensors 103 configured in an array to detect a pressure in the form of a weight on a surface of the cushion 100 to generate a detected pressure signal. In the preferred embodiment of the present disclosure, the cushion portion 100 includes an array of six separate pressure sensors 103 generally positioned near a central position of the cushion portion 100 and selected and positioned to detect a weight of an object, such as an infant or pet, placed upon the cushion portion 100 during use of the device 10 and to generate the appropriate pressure signal.

The pressure sensors 103 of the cushion portion 100 are coupled to at least a power source 104, a controller 105, a receiver 106, and transmitter 107 received within the interior space, wherein the controller 105 is configured to direct the function and transmission of the pressure sensors 103. Accordingly, the controller 105 is configured in a communicative coupling with the dongle 200 and the application 300 portion, wherein the cushion portion 100 detected pressure signal is utilized for operation of all of the alert/alarm features of the cohesive device 10.

The dongle 200 of the device 10 is generally configured as an easily accessible structure that is provided in companion with the cushion portion 100. Accordingly, it is most likely that the dongle 200 will be placed onto or carried with a vehicle key the device 10 is used within. The dongle 200 having at least one receiver 201 and a speaker/noise generation device 202 placed within an interior space and specifically configured to receive the detected pressure signal from the transmitter 107 of the cushion portion 100. The dongle 200 may include a mechanical vibration motor 203, with the motor generally configured to generate a buzz or vibration of the dongle 200. This vibration motor 203 may be of the electronic rotating mass type, the linear resonant action type, or other known mechanism capable of generating a vibration and having a size for placement within the dongle 200.

The dongle 200 and cushion 100 communicative coupling between the transmitter 107 and at least one receiver 201 configured to detect and sense a relative distance between each other, wherein the relative proximity between the dongle 200 and the cushion 100 is determined. The relative proximity between the dongle 200 and the cushion 100 enables the activation of an alarm, in the form of an audible alert tone 202 and/or vibration 203 when the dongle 200 is a preselected and predetermined distance from the cushion 100 while a pressure signal is continuously detected by the pressure sensors 103.

In addition, or alternate, to the dongle 200, the device 10 application 300 may also be utilized for proximity detection relative to the cushion 100 or the dongle 200. Accordingly, the application 300 is generally configured for use on a personal electronic device, such as, but not limited to, a cellular phone or smartphone, wherein the various electronic and hardware components of the personal electronic device are utilized by the application 300 communicative coupling to the cushion 100 and dongle 200 or just the cushion 100 or dongle 200 for the detection of the proximal distance between them. This further enables a user of the device 10 the ability to utilize software integrated with the application 300 for customizing a variety of settings, notifications, alerts, and features of the overall system of the device 10.

The application 300 including the ability to add multiple users to an account associated with a given cushion portion 100, wherein proximity or other warning or alert notifications can be provided to these multiple users to ensure quick and redundant notification and action in the event of an emergency. Still further, this application 300 may allow for the direct contact of emergency services or emergency contacts within the device or through the hardware of the device the application 300 is provided on.

Additionally, the application 300 may include additional communicative features between the cushion portion 100 and a vehicle the device 10 is used within. These communicative features may enable a communicative coupling between the device 10 and the vehicle, wherein an alarm or alert condition may trigger immediate and effective response to a given condition, such as triggering the remote starting of a vehicle to utilize the climate system of the vehicle to provide a safe environment until a direct response can be provided, such as, but not limited to, operation of the vehicle air conditioning, heater, or windows. Still further, these communicative features of the application 300 may utilize additional vehicle systems such as vehicle internal or external cameras. Alternately, the communicative features between the cushion portion 100, the dongle 200, and application 300 can generally be described as portable, wherein the device 10 can alternately operate independently of the vehicle and be considered a portable safety solution.

The alarm feature of the device 10 may generally alert a user when the distance between communicating portions 100, 200, 300 becomes too great while a detected pressure signal is sensed by the cushion portion 100 to generally indicate that an object (child, pet, person, temperature sensitive item) remains on the cushion 100 and may be in a vulnerable state or unattended. The alarm is preferably an audible noise that generates attention and is configured to crescendo in volume to increase this awareness as the proximal distance between the cushion 100 and the dongle 200 increases. Additionally, and alternately, the alarm may additionally trigger a vibration or notification on a personal electronic device the application 300 is used on.

In a preferred embodiment of the device 10, the communicative coupling of cushion portion 100, dongle 200 and application 300 is via the Bluetooth wireless communication protocol, wherein this protocol allows for the use of a proven and universal protocol for proximity detection amongst the portions 100, 200, 300.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. An apparatus configured to detect the presence of an unattended occupant within a vehicle, the apparatus comprising:
   a cushion portion, the cushion portion having a pressure sensor, the pressure sensor capable of generating a continuous detected pressure signal;
   a dongle, the dongle wirelessly coupled to the cushion portion, wherein the dongle is configured as an accessible structure configured to be coupled to a vehicle key, the dongle having an alarm to generate a verbal noise and a mechanical vibration motor, the dongle capable of receiving the continuous detected pressure signal, the dongle alarm and the mechanical vibration motor triggered when a distance between the dongle and the cushion portion is greater than a predetermined distance threshold while the continuous detected pressure signal is present;
   an application hosted on at least one personal electronic device and wirelessly coupled to the dongle, wherein the application is configured to trigger an alarm when the distance between the dongle and the cushion portion is greater than the predetermined distance threshold while the continuous detected pressure signal is present;
   wherein the application is wirelessly coupled to the cushioned portion, wherein the application receives the continuous detected pressure signal, the application triggering an alarm when the distance between the device hosting the application and the cushion portion is greater than the predetermined distance threshold while the continuous detected pressure signal is present.

2. The apparatus as in claim 1, wherein the pressure sensor is a plurality of pressure sensors.

3. The apparatus as in claim 2, wherein the plurality of pressure sensors are provided in an array.

4. The apparatus as in claim 1, wherein the cushion portion, the dongle, and the application are coupled wirelessly through a Bluetooth wireless communication protocol.

5. The apparatus as in claim 1, wherein the cushion portion includes a controller.

6. The apparatus as in claim 5, wherein the cushion portion includes a receiver.

7. The apparatus as in claim 6, wherein the cushion portion includes a transmitter.

8. An alert system and device for alerting a user to the presence of an unattended object within a confined space, the system comprising:
   a cushion portion, the cushion portion having a pressure sensor, the pressure sensor capable of detecting a weight resting upon a surface of the cushion portion and generating a continuous detected pressure signal in response to this weight;
   a dongle, the dongle wirelessly coupled to the cushion portion, the dongle configured to be removably coupled to a vehicle key, the dongle having an alarm to generate a verbal noise, the dongle capable of receiving the continuous detected pressure signal, the dongle alarm triggered when a distance between the dongle and the cushion portion is greater than a predetermined distance threshold while the continuous detected pressure signal is present;

an application, the application hosted on at least one personal electronic device and wirelessly coupled to dongle, wherein the application is configured to trigger an alarm when a distance between the dongle and the cushion portion is greater than a predetermined distance threshold while the continuous detected pressure signal is present, the application configured to transmit the alarm to at least a second personal electronic device and to allow for the direct contact of emergency services or emergency contacts within the personal electronic device;

wherein the application is wirelessly coupled to the cushioned portion, wherein the application receives the continuous detected pressure signal, the application triggering an alarm when the distance between the device hosting the application and the cushion portion is greater than the predetermined distance threshold while the continuous detected pressure signal is present.

9. The system as in claim 8, wherein the pressure sensor is a plurality of pressure sensors.

10. The system as in claim 9, wherein the plurality of pressure sensors are provided in an array.

11. The system as in claim 8, wherein the cushion portion, the dongle, and the application are coupled wirelessly through a Bluetooth wireless communication protocol.

12. The system as in claim 8, wherein the cushion portion includes a controller.

13. The system as in claim 12, wherein the cushion portion includes a receiver.

14. The system as in claim 13, wherein the cushion portion includes a transmitter.

15. An alert system and device for indicating to a user the presence of an unattended object within a confined space, the alert system and device comprising:

a cushion portion, the cushion portion having at least two pressure sensors, the at least two pressure sensors provided in an array, the at least two pressure sensors capable of detecting a weight resting upon a surface of the cushion portion and generating and transmitting a continuous detected pressure signal in response to this weight;

a dongle, the dongle wirelessly coupled to the cushion portion, the dongle configured to be removably coupled to a vehicle key, the dongle having an alarm to generate a verbal noise, the dongle capable of receiving the continuous detected pressure signal, the dongle alarm triggered, and noise generated when a predetermined distance between the dongle and the cushion portion is greater than a predetermined distance threshold while the continuous detected pressure signal is present;

an application, the application hosted on at least one personal electronic device and wirelessly coupled to dongle, wherein the application is configured to trigger an alarm when the distance between the dongle and the cushion portion is greater than the predetermined distance threshold while the continuous detected pressure signal is present, the application configured to transmit the alarm to at least a second personal electronic device and to allow for the direct contact of emergency services or emergency contacts within the personal electronic device;

wherein the application is wirelessly coupled to the cushioned portion, wherein the application receives the continuous detected pressure signal, the application triggering a notification when the distance between the device hosting the application and the cushion portion is greater than the predetermined distance threshold while the continuous detected pressure signal is present.

16. The system as in claim 15, wherein the cushion portion, the dongle, and the application are coupled wirelessly through a Bluetooth wireless communication protocol.

17. The system as in claim 15, wherein the cushion portion includes a controller, a receiver, and a transmitter.

18. The system of claim 8, wherein the confined space is a vehicle and the application is configured to allow for at least one user to remotely control electric features of the vehicle, the electric features selected from the list consisting of turning on an air conditioning, turning on a heating, and winding windows down.

* * * * *